United States Patent
Huang et al.

(10) Patent No.: US 9,440,501 B2
(45) Date of Patent: Sep. 13, 2016

(54) TIRE PRESSURE ID CODE LEARNING DEVICE AND METHOD OF LEARNING ID CODE

(71) Applicant: Mobiletron Electronics Co., Ltd., Taichung (TW)

(72) Inventors: Shiao-Hwa Huang, Taichung (TW); Kuan-Chih Huang, Changhua (TW); Yu-Liang Chou, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 138 days.

(21) Appl. No.: 14/460,618

(22) Filed: Aug. 15, 2014

(65) Prior Publication Data

US 2015/0054640 A1  Feb. 26, 2015

(30) Foreign Application Priority Data

Aug. 20, 2013  (TW) .............................. 102129771 A

(51) Int. Cl.
  *G08B 21/00* (2006.01)
  *B60C 23/04* (2006.01)

(52) U.S. Cl.
  CPC ....... *B60C 23/0437* (2013.01); *B60C 23/0415* (2013.01); *B60C 23/0461* (2013.01); *B60C 23/0472* (2013.01); *B60C 23/0479* (2013.01)

(58) Field of Classification Search
  CPC .................................................. B60C 23/0437
  USPC .............. 340/442–447; 73/146, 146.5, 146.8
  See application file for complete search history.

(56) References Cited

U.S. PATENT DOCUMENTS

| 7,948,364 B2 * | 5/2011 | Lin et al. ............ B60C 23/0433 340/442 |
| 2008/0143507 A1 * | 6/2008 | Cotton et al. ....... B60C 23/0416 340/445 |
| 2013/0120127 A1 * | 5/2013 | Sun et al. ........... B60C 23/0437 340/447 |

FOREIGN PATENT DOCUMENTS

| CN | 1777516 A | 5/2006 |
| CN | 101241633 A | 8/2008 |
| CN | 102765304 A | 11/2012 |

* cited by examiner

*Primary Examiner* — Jeffery Hofsass
(74) *Attorney, Agent, or Firm* — Ming Chow; Sinorica, LLC

(57) ABSTRACT

An ID code learning device includes a RF transceiving module, a received signal strength indication (RSSI) module, and a processing circuit. The RF transceiving module receives RF signals, and each of the RF signals contains an ID code. The RSSI module is electrically connected to the RF transceiving module to detect signal strengths of the RF signals received by the RF transceiving module. The processing circuit is electrically connected to the RF transceiving module and the received signal strength indication module respectively. The received signal strength indication module detects the RF signal with the highest signal strength, the processing circuit pairs the ID code thereof with a predetermined tire location code, and then the RF transceiving module transmits a pairing result out.

10 Claims, 4 Drawing Sheets

TIRE PRESSURE ID CODE LEARNING DEVICE AND METHOD OF LEARNING ID CODE

The current application claims a foreign priority to the patent application of Taiwan No. 102129771 filed on Aug. 20, 2013.

BACKGROUND OF THE INVENTION

1. Technical Field

The present invention relates generally to a tire pressure monitoring system, and more particularly to an ID code learning device and a method of learning ID code.

2. Description of Related Art

As development of transportation, more and more vehicles are equipped with various devices for ensuring safety driving, such as tire pressure monitoring system (TPMS). The conventional TPMS has sensors to sense pressures of tires, and the sensing results are sent to a central monitoring processor. The tire pressure monitoring system will warn the driver if the tire pressure is abnormal to ensure safety driving.

Typically, the conventional TPMS is provided with an ID (identification) code learning device which receives RF signals from the sensors in/on tires to obtain ID codes in the RF signals. The ID codes are paired with tire location codes, and then the corresponding ID codes and tire location codes are sent to the central monitoring processor and saved in the central monitoring processor. After that, the central monitoring processor may tell where the RF signals come from, and examine and show the information of each tire. Wherein the sensors may be valve type TPMS sensors using valve as antenna.

However, the conventional code learning process is applicable only in small vehicles, such as sedan and SUV. For those large vehicles, such as truck and pick-up truck, which have two tires at an end of the axle, the conventional code learning process can't identify those tires. Therefore, the central monitoring processor may generate wrong information of the tires.

BRIEF SUMMARY OF THE INVENTION

In view of the above, the primary objective of the present invention is to provide an ID code learning device and a method of learning ID code, which is able to identify the sensors on the tires at the same ends of the axle in a precise and efficient way.

The present invention provides an ID code learning device includes a RF transceiving module, a received signal strength indication (RSSI) module, and a processing circuit. The RF transceiving module receives RF signals, and each of the RF signals contains an ID code. The RSSI module is electrically connected to the RF transceiving module to detect signal strengths of the RF signals received by the RF transceiving module. The processing circuit is electrically connected to the RF transceiving module and the received signal strength indication module respectively. The received signal strength indication module detects the RF signal with the highest signal strength, the processing circuit pairs the ID code thereof with a predetermined tire location code, and then the RF transceiving module transmits a pairing result out.

The present invention further provides a method of learning ID codes with an ID code learning device, comprising: the steps of:

A. Receive RF signals, wherein each of the RF signals contains an ID code;
B. Detect signal strengths of the RF signals;
C. Pair the ID code of the RF signal with the highest signal strength with a tire location code; and
D. Transmit a pairing result of the step C out.

Whereby, with the aforementioned design of the ID code learning device, it may identify any kind of arrangement of the tires in a precise and efficient way.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
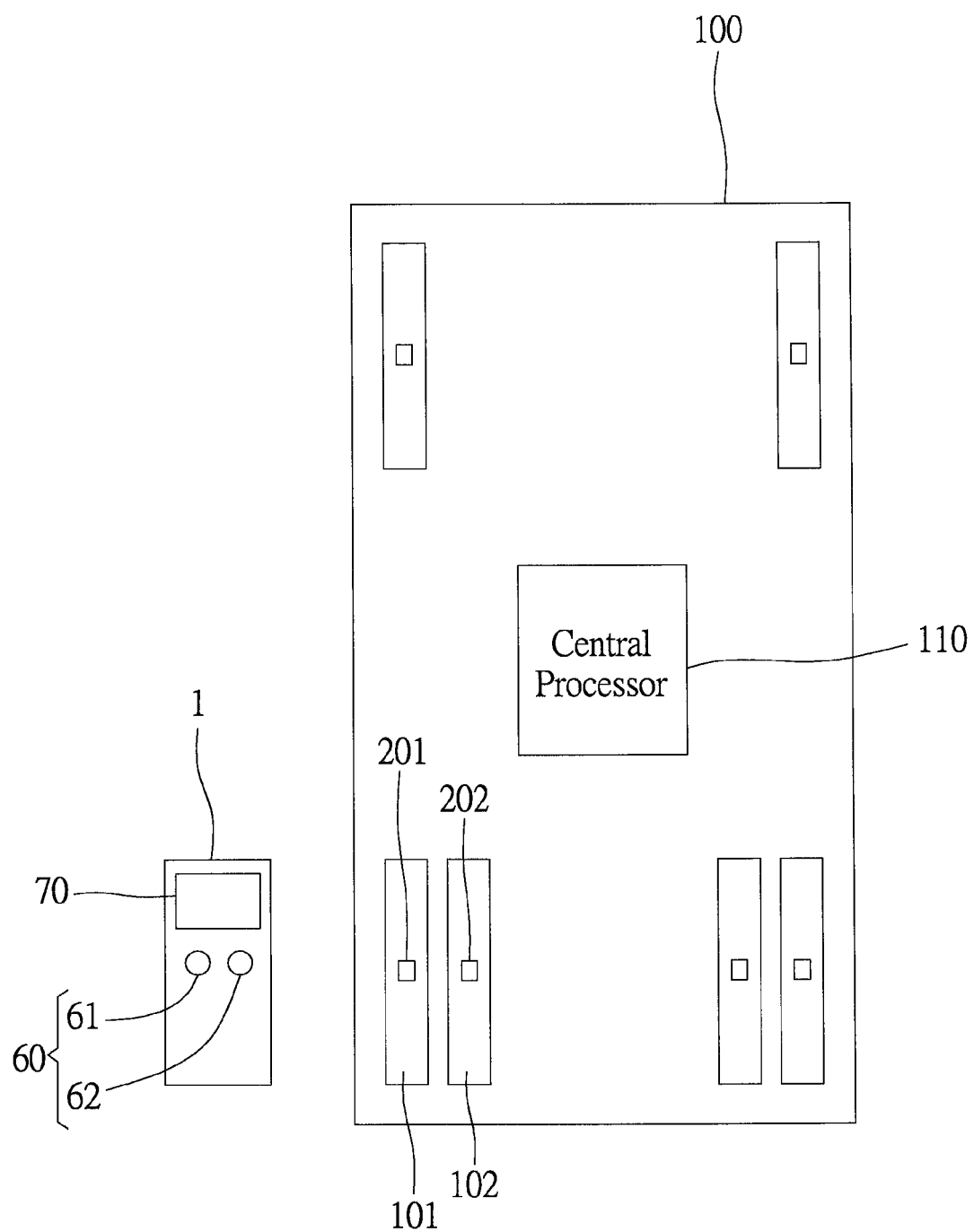
FIG. 1 is a sketch diagram, showing of the vehicle equipped with the TPMS.
Figure 2:
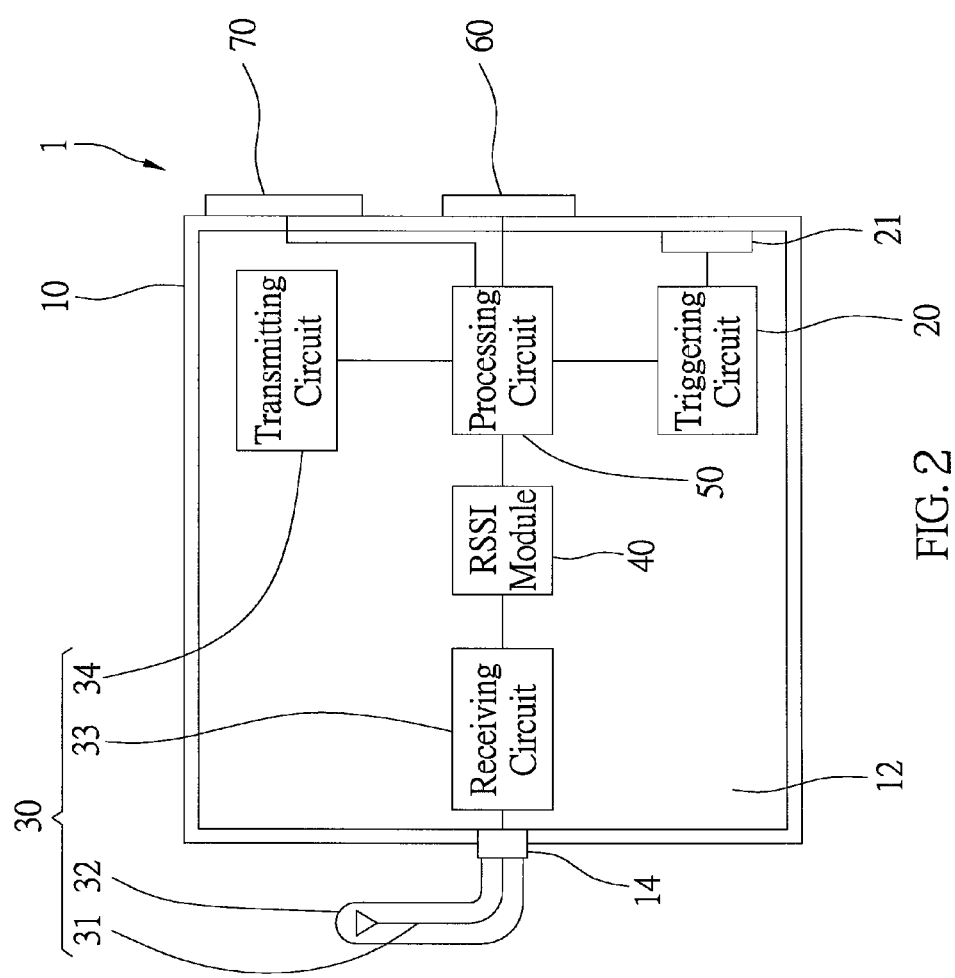
FIG. 2 is a block diagram of the ID code learning device of a first preferred embodiment of the present invention.

FIG. 1 shows a vehicle 100 equipped with a tire pressure monitoring system (TPMS). The TPMS includes a central monitoring processor 110, an ID code learning device 1, and a plurality of sensors 201, 202 installed on tires 101, 102 of the vehicle 100. The sensors 201, 202 read tire pressures of the tires 101, 102 respectively, and send RF (radio frequency) signals, which contain tire pressures, to the central monitoring processor 110. In the embodiment, the tires 101, 102 are pivoted on an end of an axle (not shown) of the vehicle 100, and hereafter the tire 101 is called an outer tire, and the tire 102 is called an inner tire. The ID code learning device 1 of a first preferred embodiment of the present invention includes a case 10, a triggering circuit 20, a RF transceiving module 30, a received signal strength indication (RSSI) module 40, a processing circuit 50, a key set 60, and a display 70.

The case 10 has a chamber 12 therein and a conductive terminal 14 on an outer side thereof.

The triggering circuit 20 is received in the chamber 12 of the case 10 to generate a low-frequency (about 125 kHz) triggering signal and transmit the triggering signal through an antenna 21. The sensors 201, 202 receive the triggering signal, and generate high-frequency (about 434 MHz) RF signals accordingly. The RF signals each contains an ID code to identify which sensor generating the RF signal. For example, if the RF signal contains an ID code of 0x00, it indicates that this RF signal comes from the sensor 201 on the inner tire 101, and if the RF signal carrying an ID code of 0x01, it indicates that this RF signal comes from the sensor 202 on the outer tire 102.

The RF transceiving module 30 includes an antenna 31, an insulating sleeve 32, a receiving circuit 33, and a transmitting circuit 34. The antenna 31 is provided on the outer side of the case 10, and electrically connected to the conductive terminal 14. The insulating sleeve 32 envelops the antenna 31 to reduce the noise. The receiving circuit 33 is received in the chamber 12 of the case 10 to receive RF signals from the antenna 31. The transmitting circuit 34 is received in the chamber 12 of the case 10 to transmit RF signals through the antenna 31.

The RSSI module 40 is received in the chamber 12 of the case 10, and electrically connected to the receiving circuit 33 to detect signal strengths of the RF signals received by the receiving circuit 33.

The processing circuit 50 is received in the chamber 12 of the case 10, and electrically connected to the triggering circuit 20, the RSSI module 40, and the transmitting circuit 34 respectively. The processing circuit 50 is provided with a memory (not shown), in which a plurality of tire location codes are saved. Each tire location code represents one of the tires of the vehicle 100. For example, the tire location code 1 represents the rear left outer (RLO) tire 101, and the tire location code 2 represents the rear left inner (RLI) tire 102.

The key set 60 includes a first key 61 and a second key 62 on the case 10, and both the keys 61, 62 are electrically connected to the processing circuit 50. When the first key 61 is pressed, the processing circuit 50 activates the triggering circuit 20 to generate a triggering signal, and get the receiving circuit 33 ready to receive the triggering signal. When the second key 62 is pressed, the processing circuit 50 controls the transmitting circuit 34 to transmit the RF signals. The key set 60 provides the user to manually input the tire location code as well. In practice, the key set 60 may have three or more keys, or only one key.

The display module 70 shows the working condition of the ID code learning device 1, such as learn mode completed, receiving signals, and transmitting signals. In the present embodiment, the display module 70 has a LCD to show the user the working condition of the ID code learning device 1. In another embodiment, the display module 70 has a plurality of LEDs and speakers to show the user the working condition with light and voice messages.

In the learn mode, the ID code learning device 1 is put at a predetermined place where a distance between the ID code learning device 1 and the sensor 201 is different from that between the ID code learning device 1 and the sensor 202. In the present embodiment, the antenna 31 of the ID code learning device 1 is closer to the sensor 201 on the outer tire 101 than the sensor 202 on the inner tire 102.

After that, the first key 61 is pressed to activate the triggering circuit 20 to generate a triggering signal, and transmit it to the sensors 201, 202 through the antenna 31. The sensors 201, 202 receive the triggering signal, and generate a RF signal accordingly. The RF signals from the sensors 201, 202 are received by the receiving circuit 33 through the antenna 31, and then the RSSI module 40 detects the RF signals to find signal strengths thereof. The RF signal with higher signal strength should come from the nearer sensor (the sensor 201 on the outer tire 101), and the RF signal with lower signal strength should come from the farther sensor (the sensor 202 on the inner tire 102). In an embodiment, the signal strength of the RF signal from the nearer sensor 201 is at least 10 dB greater than that from the farther sensor 202.

The processing circuit 50 reads the detection result of the RSSI module 40, and pairs the ID codes in the RF signals with the tire location codes according to the signal strengths of the RF signals. In the present embodiment, the ID code (0x00) of the RF signal from the nearer sensor 201 (higher signal strength) should be paired with the tire location code (1), and the ID code (0x01) of the RF signal from the nearer sensor 201 (lower signal strength) should be paired with the tire location code (2). The pairing result is transmitted to the central monitoring processor 110 through the transmitting circuit 34 and saved in the central monitoring processor 110 when the user presses the second key 62. Now, the learn mode is completed.

As a result, the processing circuit 110 may tell where the RF signal comes from, and obtain the tire information (such as tire pressure and temperature) in the RF signal, and shows them on the display module 70. In the present invention, when the processing circuit 110 receives RF signal with the ID code of 0x00, the RF signal is identified to be coming from the outer tire 101, and the messages in the RF signal is shown as the condition of the outer tire 101.

In order to make a clear distinguish between the sensors on the outer tire 101 and the inner tire 201, the user may make the insulating sleeve 32 of the ID code learning device 1 touch the sensor 201 on the outer tire 101, which means that the distance between antenna 31 of the ID code learning device 1 and the sensor 201 on the outer tire 101 is zero. The RSSI module 40 will be easier to find the strongest RF signal (there is a detected signal strength which is significantly higher than the others).

Figure 3:
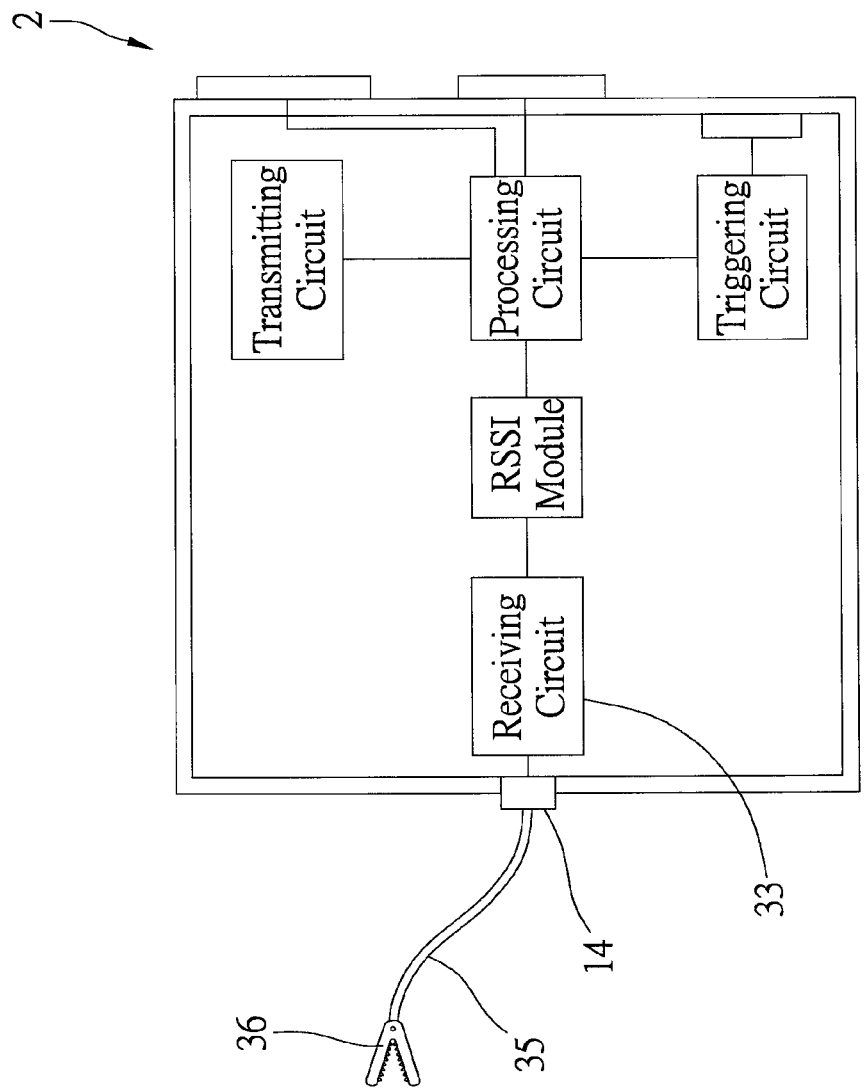
FIG. 3 is a block diagram of the ID code learning device of a second preferred embodiment of the present invention.

FIG. 3 shows an ID code learning device 2 of a second preferred embodiment of the present invention, which is basically the same as the first preferred embodiment, except that the antenna 31 is replaced by a wire 35. The wire 35 has an end connected to the conductive terminal 14, and a fastener 36 is connected to the other end of the wire 35. In the second preferred embodiment, the wire 35 is a coaxial cable, and the fastener 36 is a metal crocodile clip. With this, the user may use the crocodile clip 36 to grip the sensor 201 on the outer tire 101, therefore the RF signals of the sensor 201 are transmitted to the ID code learning device 2 through the coaxial cable 35 that may maximize the signal strengths of the RF signal of the sensor 201.

Figure 4:
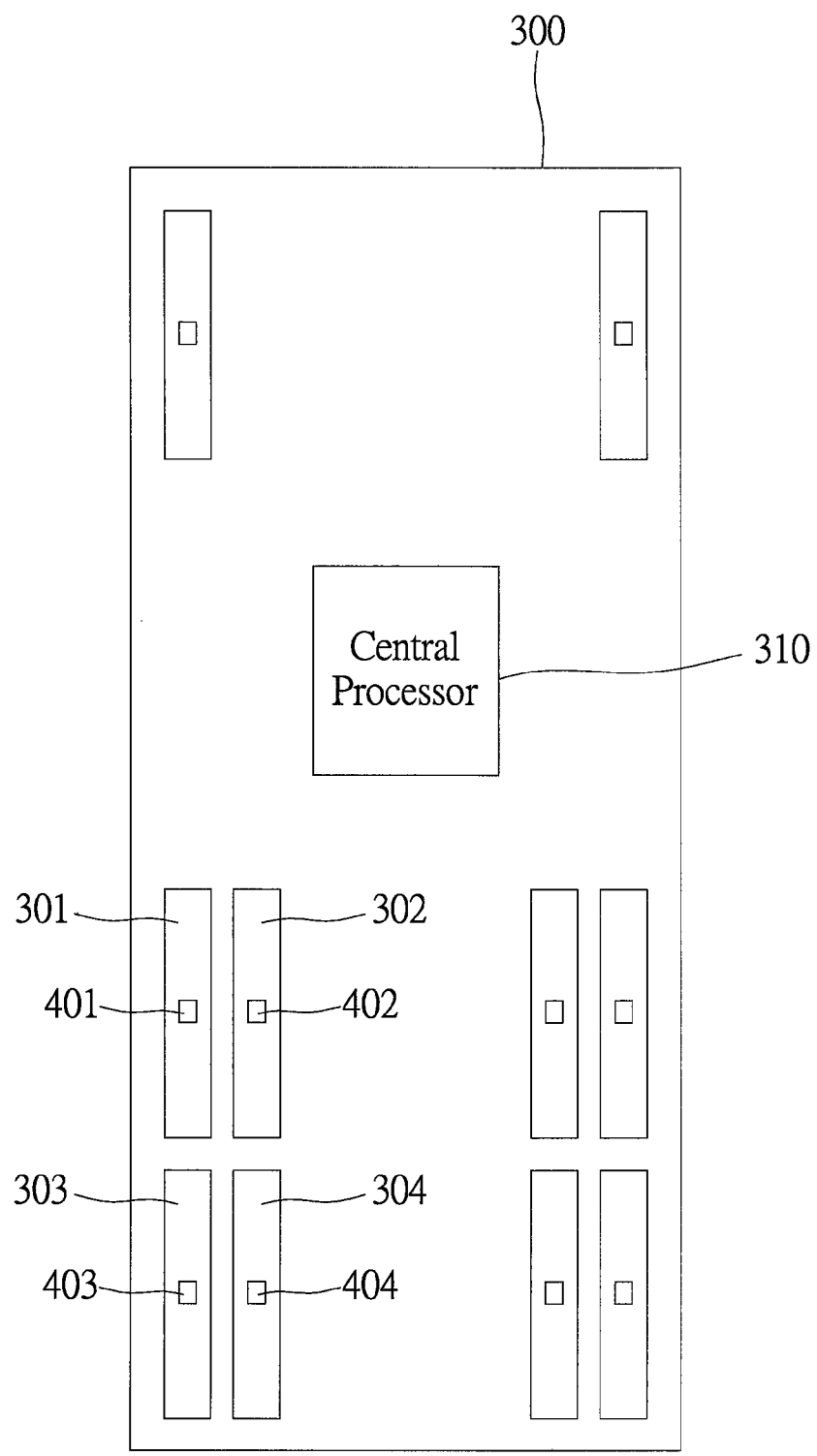
FIG. 4 is a sketch diagram, showing another vehicle equipped with the TPMS.

FIG. 4 shows a truck 300 having four tires at the rear left side thereof, and the ID code learning device of the first and second embodiments may work for such truck. In detail, the tires at the rear left side are named a first rear left tire 301, a second rear left tire 302, a third rear left tire 303, and a fourth rear left tire 304, and on each of which a sensor 401-404 is provided.

In the learn mode, the user makes the ID code learning device touch the one of the sensors (take the sensor 401 of the first rear left tire 301 for example) by the insulating sleeve 32 or the fastener 36, and then controls the ID code learning device to transmit the triggering signal and receive the RF signals from the sensors 401-404. The RSSI module 40 finds the RF signals with the highest signal strength (coming from the sensor 401 of the first rear left tire 301 of course) and processing circuit 50 pairs the ID code in the RF signal with the tire location code of the tire 401. Next, the user makes the ID code learning device touch another of the sensors (take the sensor 403 of the third rear left tire 303 for example), and then processes the same steps. It may pair the ID code in the strongest RF signal with the tire location code of the tire 403. The same procedure is taken on the rest two tires 402, 404 respectively to pair all the ID codes with the corresponding tire location codes, and complete the learn mode.

For example, the ID code of the RF signal coming from the sensor 401 on the first rear left tire 301 is 0x11, the ID code of the RF signal coming from the sensor 402 on the second rear left tire 302 is 0x12, the ID code of the RF signal coming from the sensor 403 on the third rear left tire 303 is 0x13, and the ID code of the RF signal coming from the sensor 404 on the fourth rear left tire 304 is 0x14. The central monitoring processor 310 of the truck 300 takes the tire location code 11 to be the first rear left tire 301, the tire location code 12 to be the second rear left tire 302, the tire location code 13 to be the third rear left tire 303, and the tire location code 14 to be the fourth rear left tire 304.

While the ID code learning device of the present invention is touching the sensor 401 on the first rear left tire 301 by the insulating sleeve 32 or by the fastener 36. The signal strength of the RF signal containing the ID code of 0x11 (coming from the sensor 401) is at least 10 dB greater than the other RF signals such that is easy for the RSSI module 40 to find the strongest RF signal. When the RSSI module 40 found the strongest RF signal, the central monitoring processor 310 pairs the ID code (0x11) in the strongest RF signal with the tire location code (11) of the first rear left tire 301. The same procedures are carried out on the other three tires 302, 303, 304 to pair the ID codes (0x12, 0x13, 0x14) with the tire location codes (12, 13, 14) respectively.

It must be pointed out that the embodiments described above are only some preferred embodiments of the present invention. All equivalent structures which employ the concepts disclosed in this specification and the appended claims should fall within the scope of the present invention.

What is claimed is:

1. An ID code learning device for identifying each of at least two sensors, which send out RF signals, comprising:
   a RF transceiving module, which is adapted to receive the RF signals from the at least two sensors, wherein each of the RF signals contains an ID code referring to the sensor where said RF signal comes from;
   a received signal strength indication module electrically connected to a receiving circuit of the RF transceiving module to detect signal strengths of the RF signals received by the receiving circuit; and
   a processing circuit electrically connected to a transmitting circuit of the RF transceiving module and the received signal strength indication module respectively;
   wherein the received signal strength indication module detects the RF signal with the highest signal strength, the processing circuit pairs the ID code thereof with a predetermined tire location code, and then the transmitting circuit transmits a pairing result out;
   wherein the processing circuit, the receiving circuit, the transmitting circuit, and the received signal strength indication module are received in a case, which is provided with a conductive terminal electrically connected to the receiving circuit of the RF transceiving module;
   wherein the RF transceiving module further includes a wire outside the case; the wire has an end electrically connected to the conductive terminal, and another end is adapted to be electrically connected to one of the at least two sensors to electrically transmit the RF signals from the connected sensor.

2. The ID code learning device of claim 1, wherein the processing circuit further pairs ID codes of the rest RF signals with tire location codes according to the signal strengths of the RF signals detected by the received signal strength indication module.

3. The ID code learning device of claim 1, further comprising a triggering module electrically connected to the processing circuit for transmitting a triggering signal to sensors, wherein the sensors generate the RF signals and transmit the RF signals to the RF transceiving module according to the triggering signal, and the ID codes of the RF signals represent the sensors.

4. The ID code learning device of claim 3, wherein the triggering signal is a low-frequency signal, and the RF signals are high-frequency signals.

5. The ID code learning device of claim 1, wherein the RF transceiving module further includes an antenna on an outer side of the case, and the antenna is electrically connected to the conductive terminal.

6. The ID code learning device of claim 1, wherein the RF transceiving module further includes an insulating sleeve enveloping the antenna.

7. A method of learning ID code with the device claimed in claim 1, wherein the method is adapted to be applied to a vehicle having at least two tires arranged in parallel, and each of the at least two tires has a sensor installed therein, comprising the steps of:
   A. connecting the wire of the ID code learning device to one of the at least two sensors;
   B. transmitting a triggering signal to the at least two sensors, wherein the triggering signal is adapted to trigger the at least two sensors to send out RF signals, each of which contains an ID code referring to the sensor where said RF signal comes from;
   C. with the wire, electrically receiving the RF signals from one of the at least two sensors, and wirelessly receiving the RF signals from rest of the at least two sensors, and detecting signal strengths of the received RF signals;
   D. pairing the ID code of the RF signal with the highest signal strength with a tire location code; and
   E. transmitting a pairing result of the step D out.

8. The method of claim 7, further comprising pairing the ID code of the another one of the RF signals with another tire location codes according to the signal strengths thereof in the step D.

9. The method of claim 7, wherein the triggering signal is a low-frequency signal and the RF signals are high-frequency signals.

10. The method of claim 7, further comprising step D1 after step D: connecting the wire of the ID code learning device to another one of the at least two sensors; wherein step B to step D1 are repeated until the ID code learning device has been electrically connected to each of the at least two sensors, and then step E is taken.

* * * * *